Nov. 14, 1944. W. T. STEPHENS 2,362,854
ROTARY SEAL ASSEMBLY
Filed Dec. 4, 1942
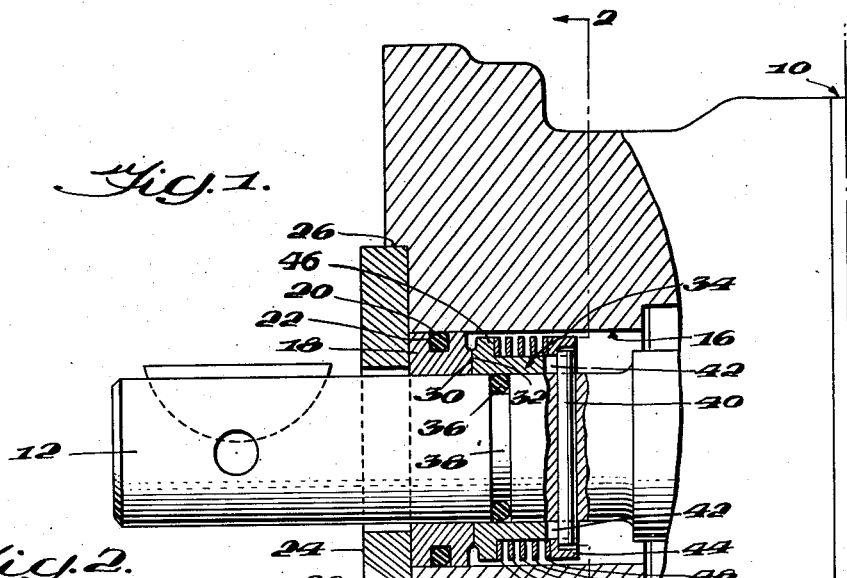
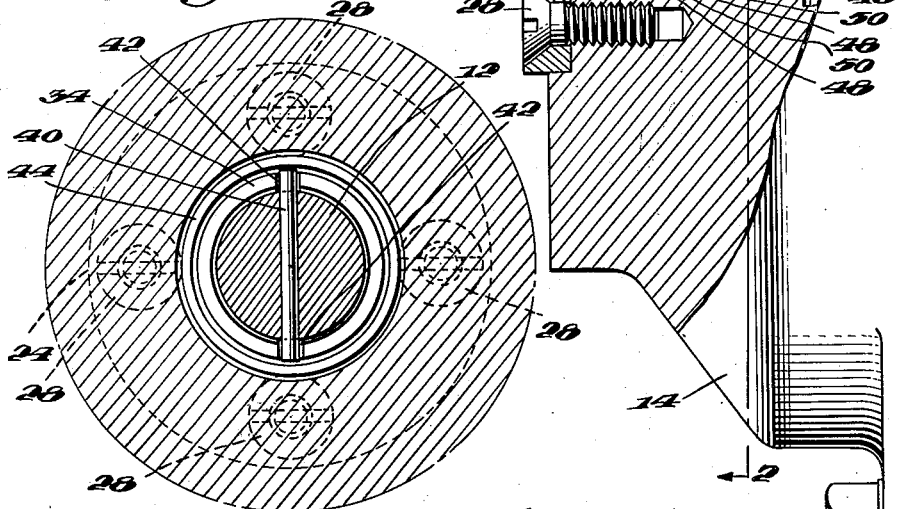
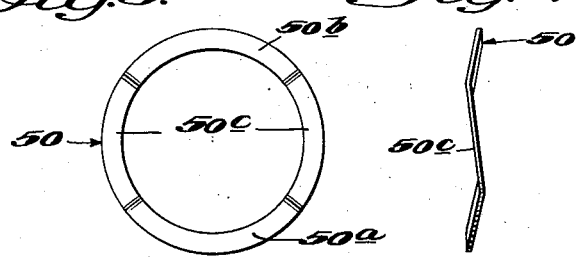 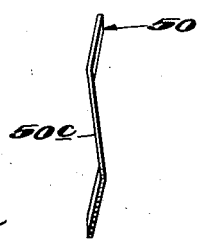
Inventor
William T. Stephens
Leech and Radue
Attorneys Patented Nov. 14, 1944

2,362,854

UNITED STATES PATENT OFFICE 2,362,854

ROTARY SEAL ASSEMBLY

William T. Stephens, Cleveland, Ohio, assignor to Hydraulic Control Engineering Company, Cleveland, Ohio, a corporation of Ohio Application December 4, 1942, Serial No. 467,889

1 Claim. (Cl. 286—7)

The invention to be disclosed herein pertains to rotary seal assemblies for use where it is necessary to obtain a fluid tight seal between a rotating shaft and a relatively fixed bore member surrounding the shaft.

One of the particular applications to which this invention has been addressed is the sealing of the rotating shaft of a gear pump, or similar device, at the point where the shaft communicates with the exterior of the housing or the like. It is the principal object of this invention to provide an efficient and simple form of seal assembly for such purposes.

More specifically, it is an object to provide a novel rotary seal assembly comprising a seal seat member and a seal sleeve member anchored respectively by means of sealing rings to the stationary surrounding bore and its coaxial rotating shaft, a securely anchored and easily removable pin means for keying the seal sleeve to the shaft, and a new combination of spring elements surrounding the seal sleeve for urging the relatively rotating and machined seal faces of the seal seat member and seal sleeve into yielding engagement with a circumferentially uniform pressure.

An additional object of the invention resides in the provision of novel spring means maintaining efficient and uniform surface contact between the relatively turning members of a rotary seal.

Other details of improvement contributing to simplicity in manufacture and dependability in operation of the rotary seal assembly of this invention will appear in the following detailed description of a preferred embodiment, taken in connection with the accompanying drawing, in which Fig. 1 is a side elevation partially in longitudinal section of the seal assembly applied to a machine having a rotary shaft;

Fig. 2 is a transverse vertical section taken on the line 2—2 of Fig. 1;

Fig. 3 is a plan view of an element of the spring means forming a part of the rotary seal assembly;

Fig. 4 is a side elevation of the element shown in Fig. 3; and

Fig. 5 is an end elevation of the same element.

Referring to Fig. 1, a machine 10 having an exposed rotary shaft 12, and illustrated as a gear pump containing a hydraulic fluid such as oil, is provided with a detachable end cover 14 which, in turn, has a cover bore portion 16 surrounding the part of the shaft 12 to be sealed. The keyed shaft 12 will in this instance be the driving shaft for the pump of which it forms a part.

The rotary seal assembly which is used in combination with the machine 10 and its shaft 12 includes a circular seal seat member 18 providing suitable clearance between the shaft 12 which it encircles and is anchored to the cover bore portion 16 by means of a seal ring 20 of circular cross-section fitted into a square peripheral groove 22. The seal ring 20 is preferably formed of a deformable rubber-like material and has its diameter approximating or slightly larger than the width of the groove 22, so that it will exert considerable pressure on the bore portion 16 and seat member 18, thus preventing relative turning of these two parts. The fluid sealing action and effective pressure of the ring 20 may be augmented by swelling due to exposure of the ring to oil from the machine 10. It is to be observed that the extended bearing of the seal member 18 within the bore portion 16 and on the shaft 12 will serve to prevent misalignment of the seal member.

The outer end of the detachable cover 14 is preferably provided with a separable, circular retaining plate 24 which passes loosely over the shaft 12 and fits within a complemental countersunk cover face 26 where it is maintained by suitable means such as a spaced series of machine screws 28. In some instances, it will be found more advantageous to make the retaining means integral with the detachable end cover 14. If this is done the same form of abutment for the outer end of the seal seat member will be provided but it will be necessary to remove the entire end cover 14 rather than merely the retaining plate 24 for access to the rotary seal assembly.

The inner end of the stationary seat member 18 is formed with a highly ground and polished seal face 30 engaging a like opposed face 32 on a seal sleeve 34 rotating with the shaft 12.

A fluid seal between the sleeve 34 and the closely fitting shaft 12 is obtained by means of a seal ring 36 retained within a groove 38 of the shaft 12. The ring 36 and groove 38 have the shape and properties described for the corresponding seal between the seat member 18 and bore portion 16 and also enable the seal sleeve 34 to resist rotation independent of the shaft 12.

A further keying of the sleeve 34 to the shaft 12 is obtained by means of a pin 40 extending centrally through the shaft 12 and projecting therefrom at both ends for engagement with corresponding diametrically spaced, open-ended slots 42 and 42 in the inner end of the sleeve 34, as viewed in Fig. 1. A retaining cup 44 fits closely over the inner slotted end of the sleeve 34 and is of such shape and relative size as to prevent withdrawal of the keying pin 40 when positioned as shown. There is a substantial amount of clearance between the outer periphery of the cup 44 and the bore portion 16, which clearance also exists at a shoulder or flange 46 formed adjacent the outer end of the sleeve 34. Between them, the sleeve shoulder 46 and retaining cup 44 receive a composite resilient means 48 and 50 which maintains the cup 44 in its innermost position abutting the pin 40 and thus produces yielding pressure between the machined seal faces 30 and 32.

The spring or resilient means just mentioned comprise a plurality of flat washers 48 and symmetrically warped spring washers 50 fitting over the seal sleeve 34 and arranged alternately with a flat washer 48 abutting the sleeve shoulder 46 and another one so engaging the retaining cup 44.

As will be obvious, compression of the spring means 48 and 50 by extraneous means causing the retaining cup 44 to move toward the sleeve shoulder 46 will permit withdrawal of the pin 40 and consequently, release of that cup and the spring means.

Reference is now made to Figs. 3, 4 and 5 which show the details of the shape of the warped spring washers 50. Each washer 50 promises four distinct arcuate portions: an upwardly and centrally apexed ninety degree segment 50a, an opposite and downwardly centrally apexed portion 50b of the same extent, these two apexed portions being connected by flat co-planar connecting portions 50c, 50c inclined slightly out of the general plane of the washer 50.

By means of the spring combination comprising the flat rings 48 and the alternating bent or warped spring washers 50, an exterior bearing pressure is obtained between the relatively rotating seal faces 30 and 32 which depend upon the finish of their surface for their sealing action. This form of bearing, which is not obtainable with ordinary helical springs, insures a substantially uniform pressure throughout the circumference of sealing engagement thus producing a more complete seal at this important point and a very even wear on the seal surfaces.

Other important features of the invention which has now been fully described include the keying of the seal seat member 18 and the seal sleeve 34 to stationary and rotating members respectively by means of the two separate deformable sealing rings 20 and 36, the convenient and efficient spring retaining means afforded by the retaining cup 44 and pin 40, and the general arrangement for maintaining seal alignment in a flexible assembly of this nature.

With the exception of the sealing rings 20 and 36 of rubber-like material, the other parts of the rotary seal assembly will ordinarily be made of metals of good grade having suitable properties for their intended purposes.

It will, of course, be understood that changes may be made in the details and arrangement of the parts of the rotary seal assembly of this invention which will come within the spirit and scope of the appended claim.

Having thus described my invention, what I claim as new and desire to secure by Letters Patent of the United States is:

In a seal assembly for a machine having a rotating shaft extending through a wall of a housing, a seal seat member loosely fitting on the shaft and within the wall of the housing, said seat member having a peripheral groove therein of rectangular cross section, a rubber-like seal ring of circular cross-sectional area with a diameter greater than either dimension of said groove disposed within the peripheral groove of the seat member and bearing against the housing to resist relative rotation, a seal sleeve extending over the shaft, said seat member and said sleeve having contacting and relatively rotating seal faces, said shaft having a peripheral groove opposite the said sleeve of rectangular cross-section, a rubber-like seal ring of circular cross-sectional area with a diameter greater than either dimension of said groove disposed within the peripheral groove of the shaft and arranged to bind the said sleeve thereto, means keying the sleeve against rotation relative to the shaft, an abutment engaging the keying means and a spring compressed between the abutment and the sleeve to force the relatively rotating seal faces together.

WILLIAM T. STEPHENS.